United States Patent [19]

Maniscalco et al.

[11] Patent Number: 4,527,827
[45] Date of Patent: Jul. 9, 1985

[54] VEHICLE RACK FOR SURFING BOARD

[76] Inventors: Jack E. Maniscalco, 9901 Lone Tree La., Tampa, Fla. 33618; Alberto Souto, 8217 La Serena Dr., Tampa, Fla. 33614

[21] Appl. No.: 530,091

[22] Filed: Sep. 7, 1983

[51] Int. Cl.³ .............................................. B60R 9/08
[52] U.S. Cl. ...................................... 296/3; 224/311; 224/324; 248/351; 108/44
[58] Field of Search ...................... 296/3, 10; 224/309, 224/311, 321, 322, 324, 42.07, 907; 248/351; 108/44

[56] References Cited

U.S. PATENT DOCUMENTS

| | | | |
|---|---|---|---|
| 2,947,566 | 8/1960 | Tower | 296/10 |
| 3,001,679 | 9/1961 | Canning et al. | 224/322 X |
| 3,064,841 | 11/1962 | Ellingson | 224/322 X |
| 3,291,427 | 12/1966 | Hutchings | 224/42.45 R |
| 4,289,260 | 9/1981 | Zoor | 224/321 X |
| 4,405,170 | 9/1983 | Raya | 296/10 |

Primary Examiner—Robert B. Reeves
Assistant Examiner—Russell D. Stormer
Attorney, Agent, or Firm—Harvey B. Jacobson

[57] ABSTRACT

An elongated generally horizontal support member is provided and a pair of oppositely downwardly and outwardly inclined horizontally spaced apart legs are supported from the opposite ends of the support member with the legs disposed in an upstanding plane containing the support member. The upper ends of the legs and the opposite end portions of the support member include coacting structure mounting the upper ends of the legs from the opposite end portions of the support member for adjustable shifting along the latter while maintaining a predetermined angular relationship between the support member and each of the legs. The coacting structure is also operative to releasably anchor each of the legs in adjusted shifted position relative to the corresponding support member end portion. The structure is carried by the lower ends of the legs for releasable engagement with corresponding upper marginal edge portions of the side walls of a pickup truck load bed whereby the support member may be supported from the pickup truck load bed side walls in elevated position relative thereto and with the support member disposed between the side walls and in an upstanding plane generally normal to the side walls.

5 Claims, 9 Drawing Figures

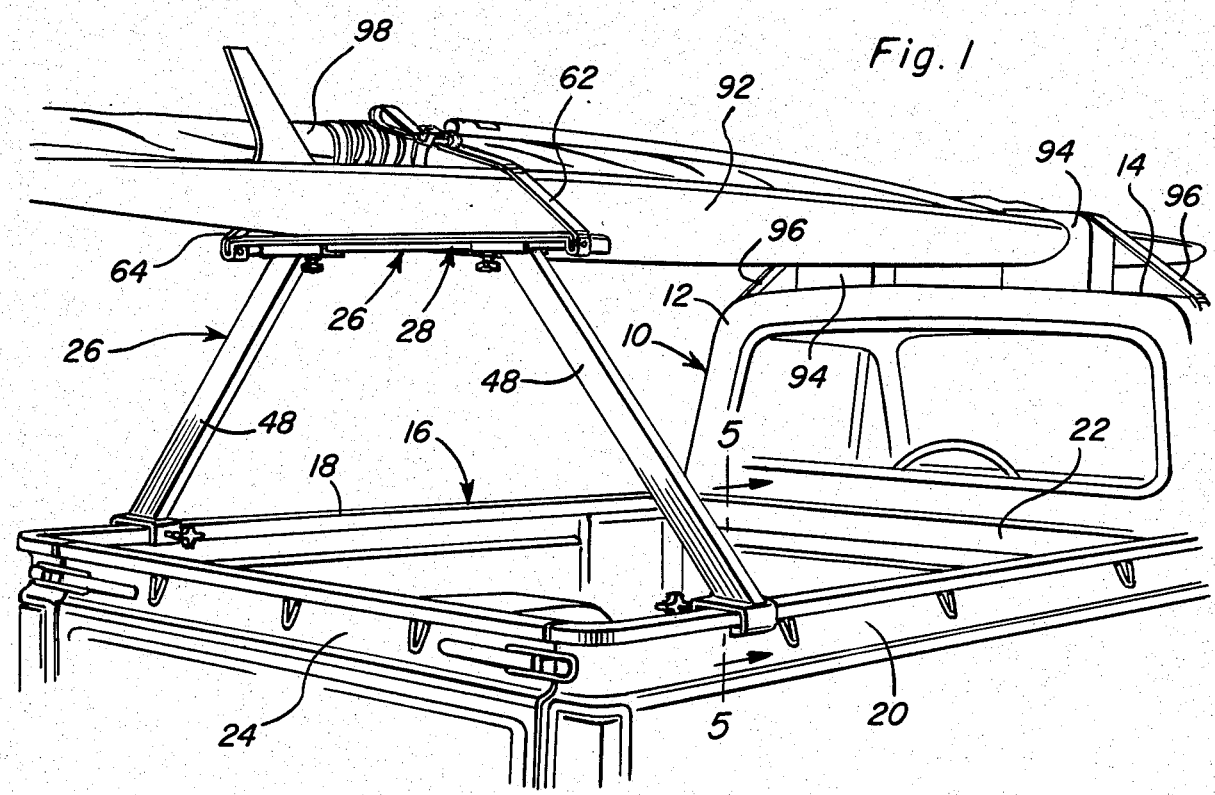
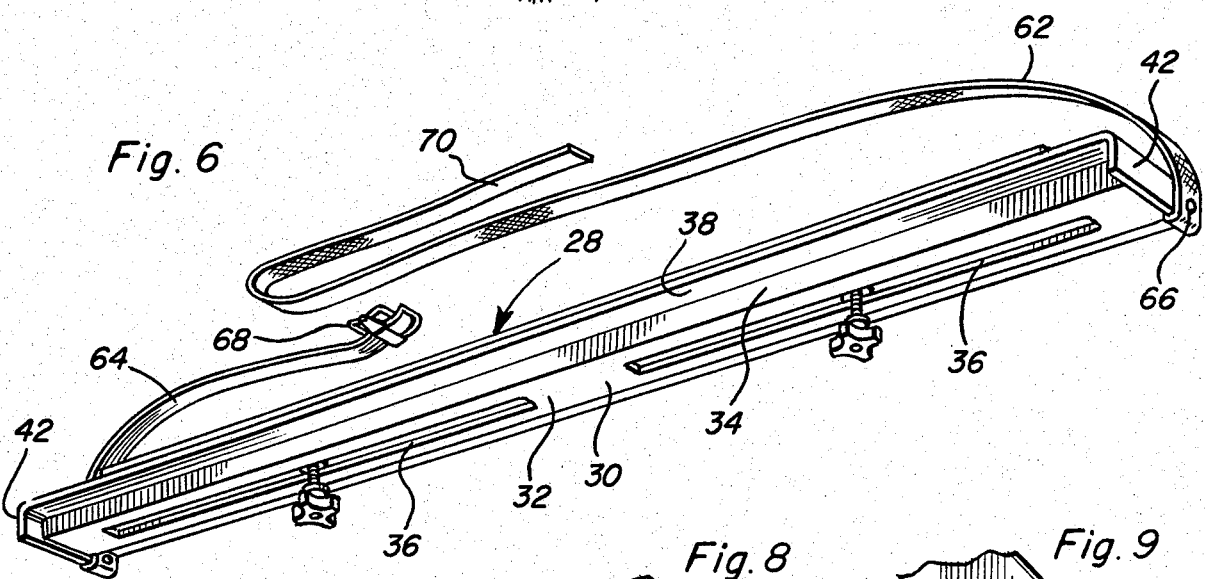
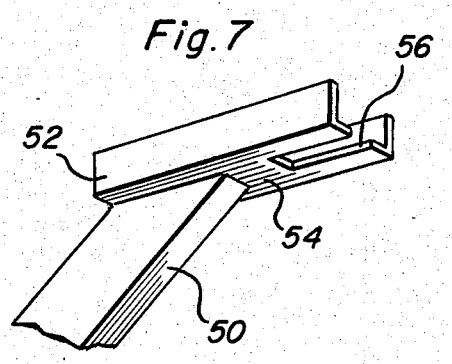
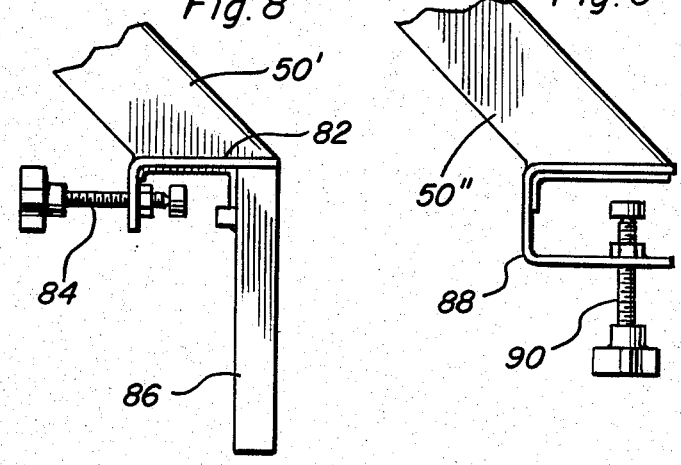

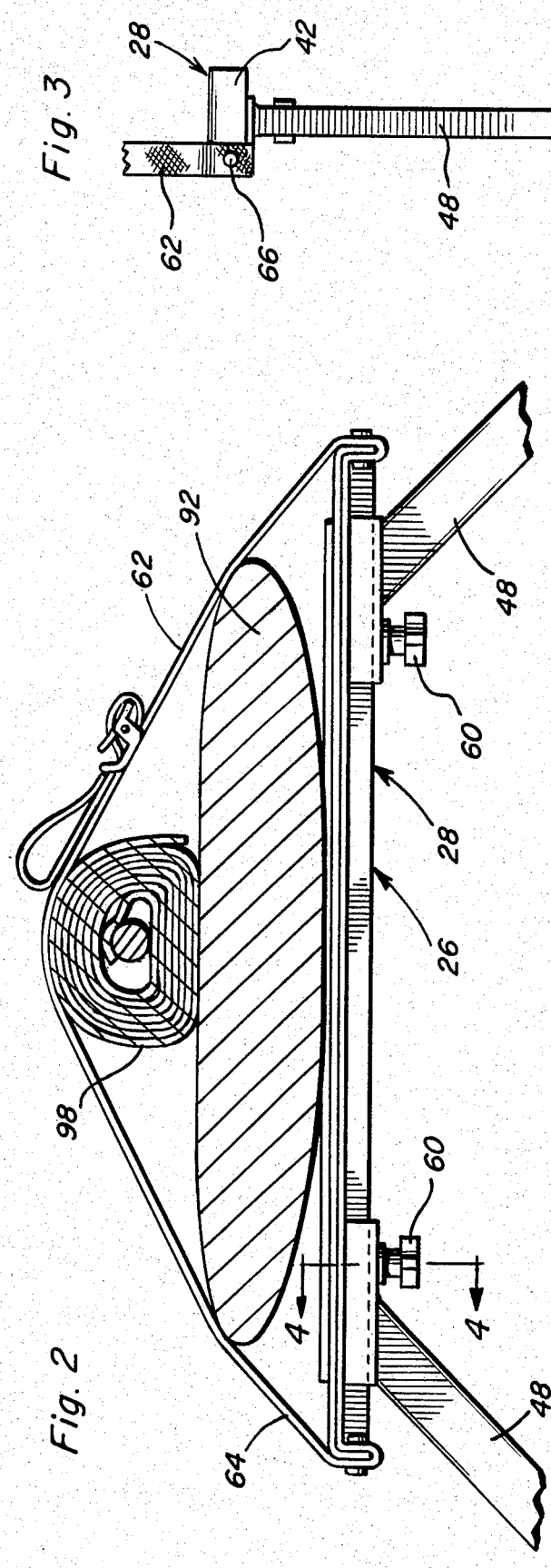

VEHICLE RACK FOR SURFING BOARD

BACKGROUND OF THE INVENTION

Many persons who own pickup trucks also enjoy surfing and wind surfing and must therefore carry their boards in the load beds of their pickup trucks. Conventionally, the boards, which are usually somewhat longer than pickup truck load beds, are secured in the load beds in inclined positions with portions of the boards resting upon the tail gates or cab portions of the pickup trucks.

Even if the tail gates, cab portions and/or boards are properly padded damage to the boards can result by transport in such a manner. Accordingly, a need exists for a means by which a surf board or wind surfing board may be carried in a more efficient manner on a pickup truck. Further, inasmuch as many persons who own pickup trucks utilize the load beds thereof to carry various other equipment, an additional need exists for a means to carry a surf board or wind surfing board from a pickup truck with the board horizontally disposed in an elevated position above the load bed to thereby enable the load bed to carry persons or other equipment.

Various different forms of load supporting racks are provided for use on pickup trucks and including some of general structural and operational features of the instant invention are disclosed in U.S. Pat. Nos. 2,570,802, 2,947,566, 2,997,330 and 4,267,948.

BRIEF DESCRIPTION OF THE INVENTION

The rack of the instant invention includes a horizontally elongated support member from whose opposite end portions oppositely downwardly and outwardly inclined support legs are supported. The upper ends of the support legs and the opposite end portions of the support member include coacting structure whereby the legs are supported from the support member in fixed angular relationship relative thereto and the coacting structure is further operative to releasably retain the legs in adjusted shifted positions. The lower ends of the legs include structure for clampingly engaging corresponding upper marginal edge portions of the load bed of a pickup truck and the support member is equipped with anchor strap means whereby a surf board or wind surfing board may be strapped in position on the support member with the board extending longitudinally of the truck, the rear end of the board being supported from the support member and the front end of the board overlying and being anchored relative to the roof of the cab of the truck.

The main object of this invention is to provide an apparatus whereby one or more elongated surf boards or wind surfing boards may be supported from a pickup truck with the boards disposed in horizontal position, having their front ends supported from the cab of pickup truck and the rear ends thereof supported in elevated position above the load bed of the pickup truck.

Still another object of this invention is to provide structure whereby various different elongated loads such as long extension ladders and the like may be supported from a pickup truck above the load bed thereof.

Yet another important object of this invention is to provide a support structure in accordance with the preceding objects and constructed in a manner whereby the support may be readily adjusted for use in conjunction with pickup trucks whose load bed side walls are spaced different distances apart.

A final object of this invention to be specifically enumerated herein is to provide a pickup truck load rack in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary perspective view of the right rear quarter portion of a pickup truck with the rack of the instant invention operatively associated therewith and having the rear end of a wind surfing board supported therefrom, the forward end of the wind surfing board being supported from the top of the cab portion of the pickup truck;

FIG. 2 is an enlarged transverse vertical sectional view of the assemblage illustrated in FIG. 1 taken substantially upon a plane spaced immediately rearwardly of the rack;

FIG. 3 is a side elevational view of the rack;

FIG. 4 is an enlarged fragmentary vertical sectional view taken substantially upon the plane indicated by the section line 4—4 of FIG. 2;

FIG. 5 is an enlarged fragmentary vertical sectional view taken substantially upon the plane indicated by the section line 5—5 of FIG. 1;

FIG. 6 is a perspective view of the upper load supporting support member portion of the rack;

FIG. 7 is an enlarged fragmentary perspective view of the upper end of one of the legs of the rack;

FIG. 9 is a fragmentary elevational view of a second form of lower leg end structure for anchoring to a different type of pickup truck load bed side wall; and FIG. 9 is a fragmentary elevational view of a third form of lower end leg structure adapted for anchoring to a third form of pickup truck load bed side wall.

DETAILED DESCRIPTION OF THE INVENTION

Referring now more specifically to the drawings the numeral 10 generally designates a conventional form of pickup truck including a cab 12 having a top 14. The pickup truck 10 additionally includes a load bed referred to in general by the reference numeral 16 including opposite side walls 18 and 20 as well as a front wall 22 and a rear tail gate 24.

The rack of the instant invention is referred to in general by the reference numeral 26 and includes an elongated horizontal support member referred to in general by the reference numeral 28 and comprising an upwardly opening base channel member 30 including upstanding opposite side flanges 34 interconnected at their lower marginal edge portions by a lower horizontal bight portion or panel member 32 having opposite end longitudinally extending slots 36 formed therein. A flat support plate 38 overlies and is anchored relative to the upper marginal edges of the flanges 34 in any convenient manner such as by welding 40 and the opposite ends of the support plate 30 project endwise outwardly.

beyond the corresponding ends of the channel member 30 and terminate in downwardly curved opposite end flanges 42.

A pair of threaded shanks 44 are provided and are slidably received in the slots 36. The upper ends of the shanks 44 include head structure 46 thereon maintaining the threaded shanks 44 captive within the channel member 30 with the lower ends of the threaded shanks 44 projecting downwardly through the slots 36.

Each opposite end portion of the support member 28 has the upper end of an inclined leg 48 secured thereto. The legs 48 comprise tubular members 50 from whose upper ends horizontal upwardly opening channel members 52 are supported and each of the channel members 52 includes a bight portion 54 having one end provided with an endwise outwardly opening longitudinal notch or slot 56. The channel members 52 snugly embrace the corresponding ends of the channel member 30 and the threaded shanks 44 project downwardly through the notches or slots 56 and have hand nuts 60 threadedly engaged therewith with friction washers 62 disposed on the threaded shanks 44 between the hand nuts 60 and the opposing lower surface portions of the bight portions 54. In this manner, the legs 48 are maintained in predetermined angular position relative to the support member 28 and yet may have the upper ends thereof shifted longitudinally of the corresponding ends of the support member 28. It will be noted that the legs 48 are disposed in an upstanding plane containing the support member 28 and that the legs 48 are oppositely downwardly and outwardly inclined.

The flanges 42 of the plate 38 have one set of ends of retaining strap members 62 and 64 anchored relative thereto by rivets or other fasteners 66 and the free end of the strap member 64 includes a buckle 68 with which the free end 70 of the strap member 62 may be adjustably engaged. In addition, the upper surface of the plate 38 includes a resilient cushioning pad 72 supported therefrom.

The lower ends of the tubular members 50 comprising the legs 48 include downwardly opening generally C-shaped channel members 74 supported therefrom with the inner leg 76 of each channel member 74 being provided with a clamp screw 78. The channel members 74 are specifically designed to engage the upper marginal edge portions 80 of the side walls 18 and 20, see FIG. 5, in order to securely anchor the lower ends of the legs 48 to the side walls 18 and 20.

In FIG. 8 of the drawings there may be seen a slightly modified form of leg defining tubular member 50' from whose lower end and L-shaped member 82 is supported including a clamp screw 84 and a depending stake 86. The structure of FIG. 8 is adapted to be used in conjunction with full size American made pickup truck side walls which have stake receiving sockets formed therein.

With attention now invited more specifically to FIG. 9, there may be seen a third form of leg defining tubular member 50'' having a C-shaped channel member 88 supported therefrom equipped with a vertically disposed clamp screw 90 and the structure of FIG. 9 is adapted to be used in conjunction with pickup truck load bed side walls whose upper marginal edges include inwardly directed stiffening flange portions, the structures of FIGS. 5 and 9 being designed for use in conjunction with the load beds of foreign made pickup trucks.

In operation, the forward end of a wind surfing board such as that indicated at 92 may be clamped between a pair of resilient blocks 92 and strapped to the top 14 of the cab 12 by suitable straps 96. The rear end of the board 92 may be supported from the support member 28 and held in position thereon by the strap members 62 and 64. Further, the sail assembly 98 of the wind surfer board 92 may be positioned on top of the board 92 and retained in position thereon by the straps 96 and the strap members 62 and 64.

As hereinbefore set forth, the upper ends of the legs 48 may be adjusted longitudinally of the support member 28. Accordingly, the rack 26 may be adjusted for use in conjunction with pickup truck load beds whose side walls are spaced different distances apart.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a pair of generally parallel walls, a rack for supporting a load in position spaced above said walls and between the latter, said rack comprising an elongated support member for disposition in elevated position above the area disposed between said side walls and with said support member extending transverse to said side walls, a pair of oppositely downwardly inclined and horizontally spaced apart legs, the upper ends of said legs and the opposite end portions of said support member including coacting means mounting the upper ends of said legs to said end portions of said support member for adjustable shifting therealong while maintaining a predetermined angular relationship between said support member and each of said legs and releasably anchoring each of said legs in adjusted shifted position along the corresponding support member end portion, support means carried by the lower ends of said legs releasably supporting said lower ends from the upper marginal edge portions of said walls, said support means comprising downwardly opening generally C-shaped channel members carried by the lower ends of said legs and disposed generally transverse to said support member, said channel members each being provided with a clamp screw threadedly supported therefrom, the remote sides of said C-shaped channel members including depending stake portions for downward reception in upwardly opening stake receiving pockets formed in the upper edges of said walls.

2. The combination of claim 1 wherein said walls comprise the side walls of a pickup truck load bed.

3. The combination of claim 1 wherein the opposite end portions of said support member each have one end of an associated elongated flexible anchor member secured thereto.

4. The combination of claim 1 wherein said support member includes an elongated longitudinally extending lower panel member, the opposite end portions of said lower panel member having longitudinal slots formed therein, a pair of threaded shank members extending through and slidable in said slots and including upper end head portions opposing the upper surfaces of said panel member disposed on opposite sides of said slot, the upper end portions of said legs including horizontal upwardly opening channel members in which the opposite end portions of said panel member are snugly slidably received, the adjacent ends of said channel members including endwise outwardly opening slots, the lower ends of said shank members being received through said endwise outwardly opening slots and having threaded nut members threadedly engaged thereon, said panel member, slots, threaded shank members, leg upper end channel members and nut members comprising said coacting means mounting the upper ends of said legs to said end portions of said support member.

5. The combination of claim 4 wherein said walls comprise the side walls of a pickup truck load bed.

* * * * *